(12) United States Patent
Helder

(10) Patent No.: US 7,033,066 B2
(45) Date of Patent: Apr. 25, 2006

(54) HYDRAULIC ACTUATOR ASSEMBLY WITH ROTATION RESTRAINT

(76) Inventor: Bruce A. Helder, 1336 Richwood Dr., SE., Grand Rapids, MI (US) 49508

( * ) Notice: Subject to any disclaimer, the term of this patent is extended or adjusted under 35 U.S.C. 154(b) by 229 days.

(21) Appl. No.: 10/605,734

(22) Filed: Oct. 22, 2003

(65) Prior Publication Data

US 2004/0105340 A1 Jun. 3, 2004

Related U.S. Application Data

(60) Provisional application No. 60/319,650, filed on Oct. 25, 2002.

(51) Int. Cl.
*B28C 5/42* (2006.01)
(52) U.S. Cl. .............. 366/68; 92/61; 92/146
(58) Field of Classification Search .......... 368/68, 368/184, 187; 92/61, 146
See application file for complete search history.

(56) References Cited

U.S. PATENT DOCUMENTS

| | | | | |
|---|---|---|---|---|
| 1,145,908 A | * | 7/1915 | McElroy | 92/146 |
| 2,672,327 A | * | 3/1954 | Oury | 366/68 |
| 2,880,977 A | * | 4/1959 | Maxon | 366/46 |
| 2,968,382 A | * | 1/1961 | Oury | 193/10 |
| 3,334,872 A | * | 8/1967 | Hansen et al. | 366/68 |
| 3,481,440 A | * | 12/1969 | Jackoboice | 193/10 |
| 4,341,423 A | | 7/1982 | Fachini et al. | |
| 4,363,380 A | * | 12/1982 | Rued et al. | 187/274 |
| 4,392,563 A | * | 7/1983 | Holman | 193/10 |
| 4,439,943 A | | 4/1984 | Brakhage | |
| 4,442,759 A | | 4/1984 | Elser | |
| 4,462,580 A | | 7/1984 | Nielsen | |
| 4,651,628 A | | 3/1987 | Zag et al. | |
| 4,726,284 A | | 2/1988 | Green | |
| 4,736,675 A | | 4/1988 | Stoll | |
| 4,750,408 A | | 6/1988 | Stoll | |
| 5,178,252 A | * | 1/1993 | Smith | 193/5 |
| 5,192,178 A | * | 3/1993 | Silbernagel | 414/523 |
| 5,431,087 A | * | 7/1995 | Kambara | 92/146 |
| 5,551,776 A | * | 9/1996 | Zimmerman | 366/68 |
| 5,761,985 A | | 6/1998 | Stoll | |
| 5,974,948 A | | 11/1999 | Thompson et al. | |
| 6,023,983 A | | 2/2000 | Gerber et al. | |
| 6,041,907 A | * | 3/2000 | Bonnette | 193/6 |
| 6,129,003 A | | 10/2000 | Udagawa | |
| 6,176,114 B1 | | 1/2001 | Gmurowski | |
| 6,352,018 B1 | | 3/2002 | Krisher | |
| 6,386,291 B1 | | 5/2002 | Short et al. | |
| 6,386,571 B1 | | 5/2002 | Vollmer et al. | |

* cited by examiner

*Primary Examiner*—David Sorkin
(74) *Attorney, Agent, or Firm*—McGarry Bair PC

(57) ABSTRACT

A hydraulic actuator assembly comprises a pair of hydraulic actuators having cylinders, pistons, and piston rods that are ganged together for extension of their respective piston rods in longitudinally opposite directions wherein at least one of the actuators comprises an anti-rotation mechanism that prevents rotation of the actuator assembly about its longitudinal axis. The anti-rotation mechanism comprises an axial anti-rotation rod rigidly attached to a cylinder having a non-circular cross-section slidably complementary to a non-circular aperture in a hollow piston rod. The piston rod can travel longitudinally along the anti-rotation rod, but is prevented from rotating by the non-circular cross-section.

22 Claims, 5 Drawing Sheets

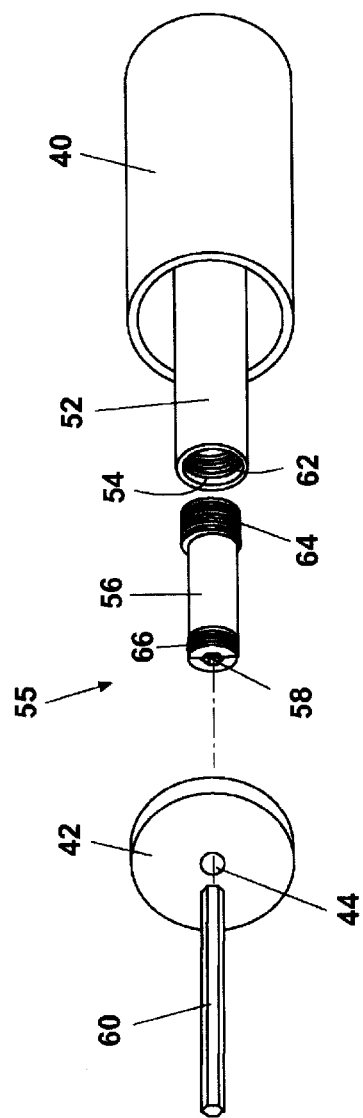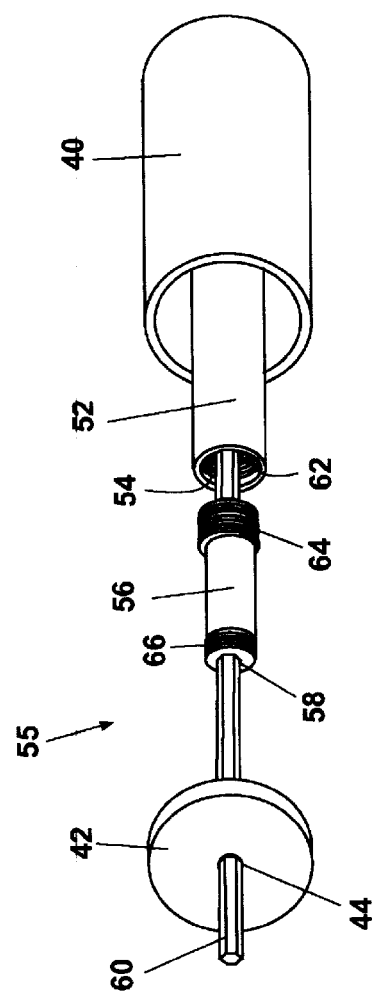
Fig. 4
Fig. 5

HYDRAULIC ACTUATOR ASSEMBLY WITH ROTATION RESTRAINT

CROSS REFERENCE TO RELATED APPLICATIONS

This application claims the benefit of U.S. provisional application Ser. No. 60/319,650, filed Oct. 25, 2002, which is incorporated herein in its entirety.

BACKGROUND OF INVENTION

1. Field of the Invention

The invention relates generally to hydraulic actuator assemblies. In one of its aspects, the invention relates to a pair of hydraulic actuators rigidly ganged together wherein the piston rods of the cylinders are extendible in parallel, longitudinally opposed directions. In another aspect, the invention relates to a hydraulic actuator assembly comprising a pair of hydraulic actuators rigidly ganged together wherein at least one of the piston rods is prevented from rotating relative to the hydraulic cylinder in which it is reciprocally mounted. In another aspect, the invention relates to a hydraulic actuator assembly comprising a pair of hydraulic actuators rigidly ganged together in which at least one of the piston rods is prevented from rotating relative to a hydraulic cylinder wherein one of the piston rods is attached to a concrete delivery chute of a concrete mixer truck, and the other piston rod is attached to the chassis of the concrete mixer truck.

2. Description of the Related Art

Hydraulic actuators are well known in the art and comprise a cylinder, a piston moving longitudinally within the cylinder, a piston rod coaxially connected to the piston and extending coaxially outside the cylinder, and end caps for fluidly sealing the cylinder. The cylinder contains hydraulic fluid under pressure, the piston rod is the moving element, the piston separates the cylinder into two separate cavities, and the end caps seal the cylinder to contain the fluid inside the cylinder. The piston is typically not restrained against rotation within the cylinder. Typically some type of mounting ends are used to affix the cylinder and piston rod in place.

Hydraulic actuators are employed in numerous applications to move a first element or part of an assembly relative to a second element. As an example, hydraulic actuators have been used to selectively position a concrete delivery chute on a front unloading concrete mixer truck. The actuator enables the chute to be readily positioned by the operator for delivery of the fresh concrete to a selected location. A typical hydraulic actuator used in this application comprises a single rod, double acting actuator. The cylinder is attached to the first part of the assembly, such as an anchoring point on the transit mixer chassis, and the piston rod is attached to the second element, such as the delivery chute. The attachments prevent rotation of the piston rod relative to the cylinder.

In order to provide an extended range beyond the range enabled by the stroke of a typical single rod actuator, a dual (or piggyback) cylinder actuator assembly was developed. The dual cylinder actuator assembly comprises two cylinders laterally connected together with the piston rods extending longitudinally in opposite directions to give approximately twice the piston rod stroke of a single rod actuator. However, because the dual cylinder actuator assembly is mounted at each end by a piston rod and not by a fixed cylinder base end, as is the case with a single rod actuator, the dual cylinder actuator assembly is suspended between the concrete delivery chute and the transit mixer chassis, which are moveable relative to each other. This relative movement will translate into rotation of the cylinders relative to the pistons and piston rods.

When the transit mixer travels down the road, the dual actuator is free to swing back and forth, which can seriously damage the actuator assembly and render the transit mixer unusable. It can also cause hydraulic connecting hoses attached to the cylinders to be pulled loose, resulting in the loss of hydraulic fluid.

To solve this problem, external anti-rotation devices have been developed to prevent the cylinders from rotating. These devices are typically added to the exterior of one of the dual cylinders.

One such device comprises a square hollow tube welded longitudinally to the side of the cylinder tube. A solid square bar adapted to slide inside the hollow tube, is inserted into the hollow tube and affixed to the mounting end of the piston rod. As the cylinders translate relative to the piston rods, the square solid bar translates along the hollow square tube (like a trombone slide), thereby preventing the piston rod from rotating relative to the cylinder. However, this assembly is very bulky and heavy, and subject to external damage. Furthermore, the assembly requires constant greasing and maintenance. The cylinder is regularly covered with cement dust which collects between the solid bar and the hollow tube, and causes them to stick together and/or travel inconsistently. Unless greasing and maintenance are performed regularly, the buildup of cement dust can harden, and the device can consequently break or no longer function properly. The device is also subject to the intrusion of water, leading to rusting which can also cause it to prematurely fail.

This device is also difficult to mount on the mixer, as the alignment between the non-rotational rod mount and the cylinder mount is critical and difficult to keep in alignment during installation. The device is also difficult to manufacture and therefore costly.

SUMMARY OF INVENTION

According to the invention, a hydraulic actuator assembly for moving a first object relative to a second object comprises a first hydraulic actuator and a second hydraulic actuator that are rigidly ganged together so that their respective piston rods are movable along parallel longitudinal cylinder axes and in opposite directions and at least one of the piston rods is non-rotationally mounted to its respect cylinder to prevent relative rotation of the one cylinder rod with respect to its respective cylinder. The hydraulic actuator assembly is preferably used to control a cement chute in a cement truck.

Typically, the first hydraulic cylinder has a first cylinder with a first longitudinal axis and a first piston, slidable within the cylinder, and attached to a first piston rod for movement along the first longitudinal axis with respect to the cylinder. The second hydraulic actuator has a second cylinder with a second longitudinal axis, and a second piston, slidable in the second cylinder, and attached to a second piston rod for movement along the second longitudinal axis with respect to the second cylinder. A non-rotation mounting is provided between at least the second piston rod and the second cylinder for non-rotational movement of the second piston rod along the second longitudinal axis. A rigid mounting is provided between the first cylinder and the second cylinder so that the first longitudinal axis is parallel to the second longitudinal axis, and the first piston rod and the second piston rod are movable in opposite directions. The second piston rod can have an axial bore therein.

The non-rotation mounting can comprise an anti-rotation rod having a non-circular cross-section and adapted for slidable translation within the axial bore. At least a portion of the axial bore can be adapted with a non-circular cross-section complementary to the cross-section of the anti-rotation rod for slidable non-rotatable receipt of the anti-rotation rod. The anti-rotation rod can have a recti-linear or hexagonal cross-section, or one of the anti-rotation rod and the axial bore can comprise a key and the other of the anti-rotation rod and the axial bore can comprise a complementary channel adapted for slidable receipt of the key therein.

The second actuator can have an end cap that is non-rotatable about the second longitudinal axis, with the anti-rotation rod rigidly attached to the end cap for insertion in the axial bore and restrained from rotational movement about the second longitudinal axis. The non-rotation mounting can further comprise a rod insert that is non-rotatably attached to the second piston rod within the second cylinder, the rod insert having a non-circular aperture coaxial with the second longitudinal axis and complementary to the cross-section of the anti-rotation rod, and the anti-rotation rod slidably received in the non-circular aperture of the rod insert to prevent rotation of the second piston rod relative to the anti-rotation rod.

The hydraulic actuator assembly can further comprise a non-rotation mounting between the first piston rod and the first cylinder for non-rotational movement of the first piston rod about the first longitudinal axis. The non-rotation mounting can alternatively comprise a cylinder end cap non-rotatably attached to the second cylinder and having a non-circular aperture therethrough, with the second piston rod having a non-circular cross-section complementary to the non-circular aperture and adapted for slidable receipt in the non-circular aperture.

BRIEF DESCRIPTION OF DRAWINGS

In the drawings:

FIG. 4 is a first exploded view of a portion of the hollow rod actuator shown in FIG. 2 illustrating a hydraulic cylinder, a hollow piston rod, an insert, and an end cap adapted to receive an anti-rotation rod according to the invention.

FIG. 5 is a second exploded view of a portion of the hollow rod actuator shown in FIG. 4 illustrating the assembly of the hydraulic cylinder, the hollow piston rod, the insert, the end cap, and the anti-rotation rod according to the invention.

DETAILED DESCRIPTION

Figure 2:
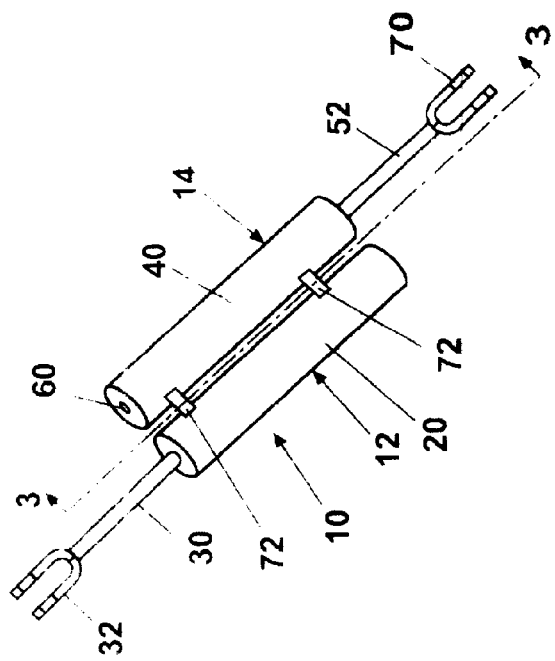
FIG. 2 is an enlarged view of the non-rotational, dual hydraulic actuator assembly shown in FIG. 1 comprising a solid rod actuator and a hollow rod actuator.
Figure 1:
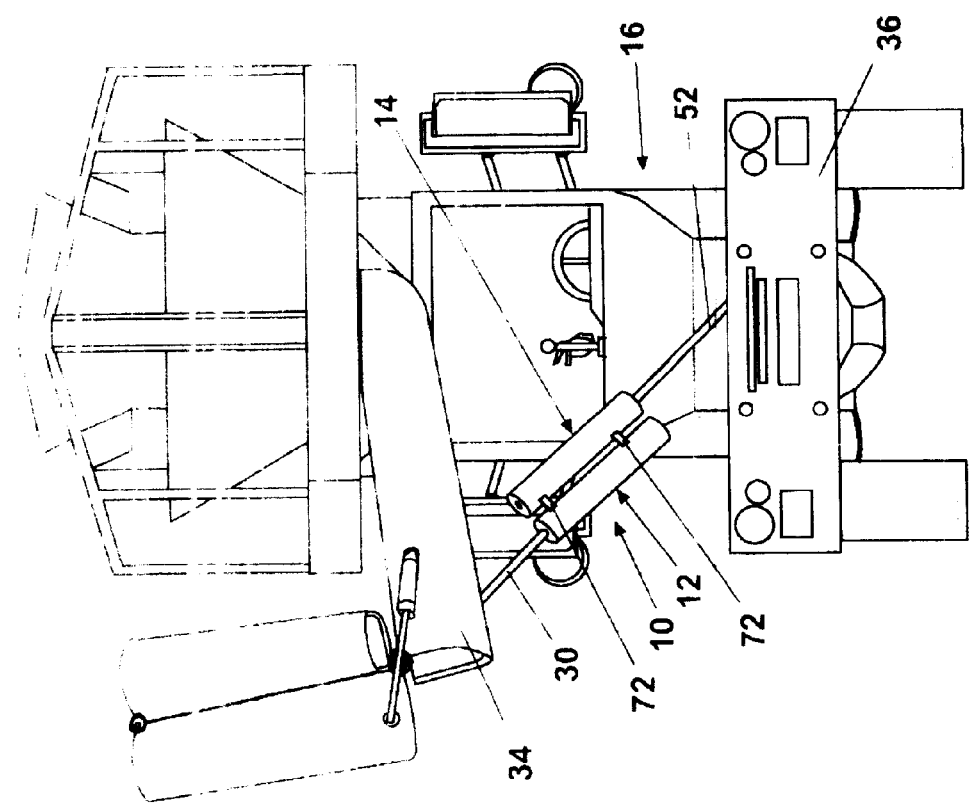
FIG. 1 is a front elevational view of a concrete mixer truck comprising a non-rotational, dual hydraulic actuator assembly according to the invention.

Referring now to the drawings, and to FIG. 1 in particular, according to the invention a non-rotational dual hydraulic actuator assembly 10 comprises two hydraulic actuators 12, 14 that are ganged together for extension of their respective piston rods 30, 52 in opposite directions wherein at least one of the actuators comprises a mechanism that prevents rotation of the actuator assembly 10 about its longitudinal axis. FIG. 1 illustrates the hydraulic actuator assembly 10 incorporated into a concrete mixer truck 16 for positioning of a moveable concrete delivery chute 34. A first piston rod 30 of the dual hydraulic actuator assembly 10 is attached to the delivery chute 34 and a second piston rod 52 is attached to a suitable anchor point on the transit mixer chassis, such as a bumper 36, a frame element, or the like. As shown also in FIGS. 2 and 3, the hydraulic actuator assembly 10 comprises a pair of cylinders 20, 40 rigidly ganged together through a suitable rigid mounting 72, such as by welding or casting the cylinders 20, 40 together, in a longitudinal direction so that the piston rods 30, 52 of the cylinders 20, 40 are extendible in longitudinally opposed directions.

Figure 3:
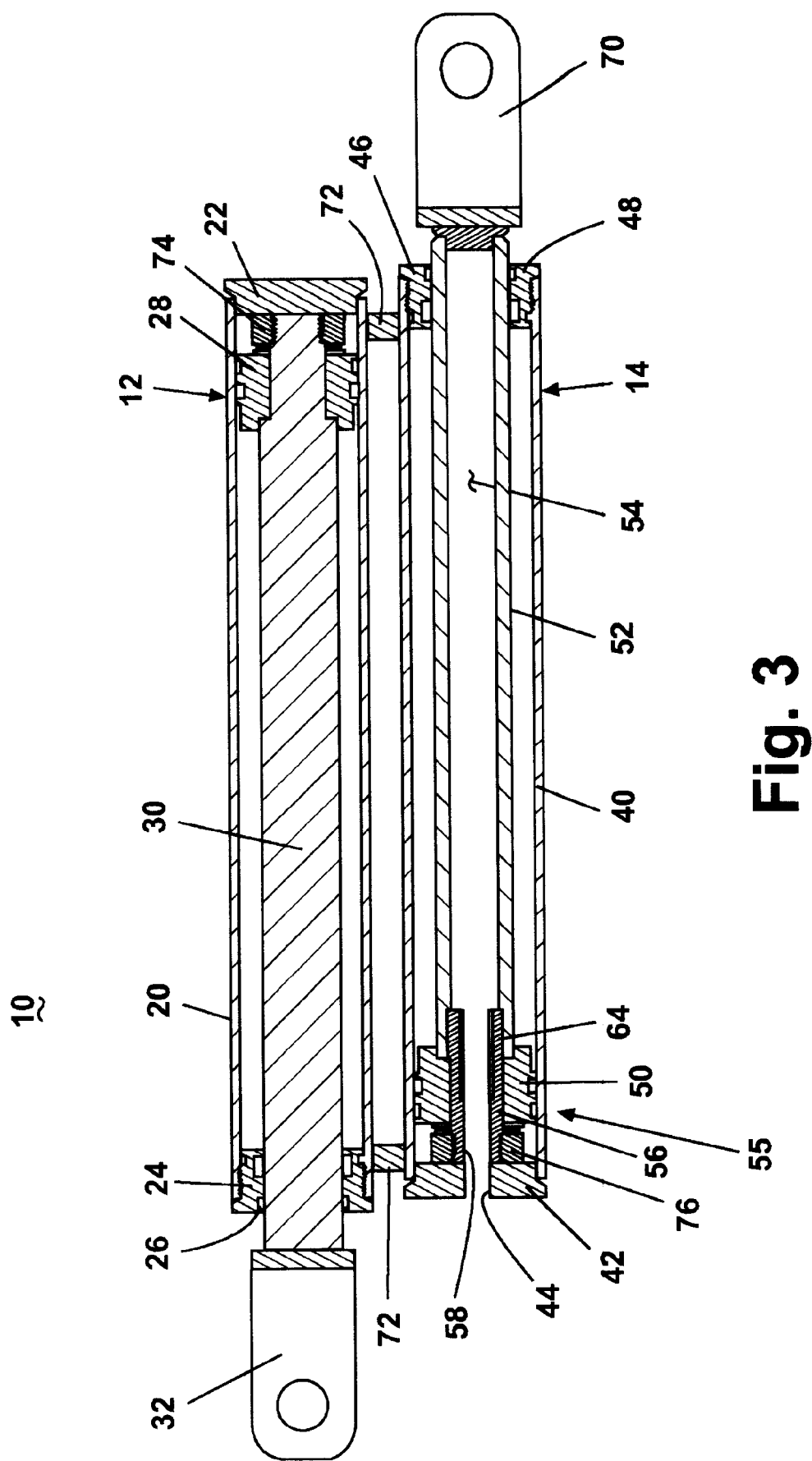
FIG. 3 is a sectional view of a portion of the non-rotational, dual hydraulic actuator assembly taken along line 3—3 of FIG. 2.

As shown in FIG. 3, the hydraulic actuator assembly 10 comprises a solid rod actuator 12 and a hollow rod actuator 14 rigidly ganged together in generally parallel juxta-position. The solid rod actuator 12 comprises a generally well-known hydraulic actuator comprising a hollow cylinder 20 closed at a first end with a circular end cap 22 and at a second end with a circular annular cap 24 having a circular rod aperture 26 extending coaxially therethrough. A circular piston 28 is adapted for slidable translation along the interior of the cylinder 20 and is rigidly attached to a second end of the piston rod 30 in a suitable manner, such as by threading the piston rod 30 into a suitable threaded aperture in the piston 28 and securing the piston 28 to the piston rod 30 with a lock fastener 74, such as a lock nut, with the first end extending coaxially through the rod aperture 26. A well-known shackle 32 is rigidly attached to the first end of the piston rod 30 and is adapted for pivotal attachment to a first movable element, such as the concrete delivery chute 34 shown in FIG. 1.

The hollow rod actuator 14 comprises a hollow cylinder 40 closed at a first end with a circular annular end cap 42 having a circular opening 44 extending coaxially therethrough and at a second end with a circular annular cap 46 having a circular rod aperture 48 extending coaxially therethrough. The annular end cap 42 is fixedly attached to the first end of the cylinder 40, such as by welding or a threaded connection. A circular piston 50 is adapted for slidable translation along the interior of the cylinder 40 and is provided with a threaded aperture extending coaxially therethrough. The piston rod 52 is hollow and defines a rod bore 54 extending axially therethrough in coaxial register with the opening 44. As shown in FIG. 3, the piston rod 52 terminates at a first end in a well-known shackle 70 adapted for pivotal attachment to an anchor point such as the bumper 36 of the transit mixer 16 shown in FIG. 1. As shown in FIGS. 4 and 5, the second end of the piston rod 52 terminates in a threaded section 62 extending some distance into the rod bore 54. (The piston 50 has been removed in FIGS. 4 and 5 for clarity.)

A non-rotation mounting 55 comprises a rod insert 56 and an anti-rotation rod 60 as hereinafter described. The rod insert 56 is an elongated, generally annular member shown in FIGS. 4 and 5 having an insert bore 58 extending axially therethrough. In one embodiment, the insert bore 58 is provided with at least one flat side, and is preferably square or hexagonal in cross-section. The rod insert 56 is provided at a first end with a length of piston rod threads 64, and at a second end with a length of piston threads 66. The piston rod threads 64 are adapted for threadable register with the threaded section 62 so that the rod insert 56 can be threaded to the piston rod 52 to extend coaxially therefrom. A lock fastener, such as a locknut or other suitable locking mechanism such as a setscrew, can be used to lock the rod insert 56 to the piston rod 52. Alternatively, the rod insert 56 can be welded or otherwise rigidly attached to the piston rod 52 in a well-known manner. The piston threads 66 are adapted so that the piston 50 can be coaxially threaded to the rod insert 56 for rigid attachment of the piston 50 to the piston rod 52. A lock fastener 76, such as a locknut threaded onto the piston threads 66, or other suitable locking mechanisms, can be used to secure the piston 50 to the rod insert 56. Alternatively, the piston 50 can be welded or otherwise rigidly attached to the rod insert 56 in a well-known manner.

In another embodiment, the insert 56 can be omitted, and the piston rod 52 provided with the piston threads 66 and the flat-sided bore 58.

The anti-rotation rod 60 is a generally thin, elongated member having a cross-section complementary to the cross-section of the insert bore 58 and adapted for non-rotational slidable register with the insert bore 58. (The anti-rotation rod 60 is omitted in FIG. 3 for clarity.) The rod insert 56 is typically machined from a material, such as brass or bronze, that minimizes wear on the anti-rotation rod 60 as it travels in and out of the rod insert 56.

Figure 6:
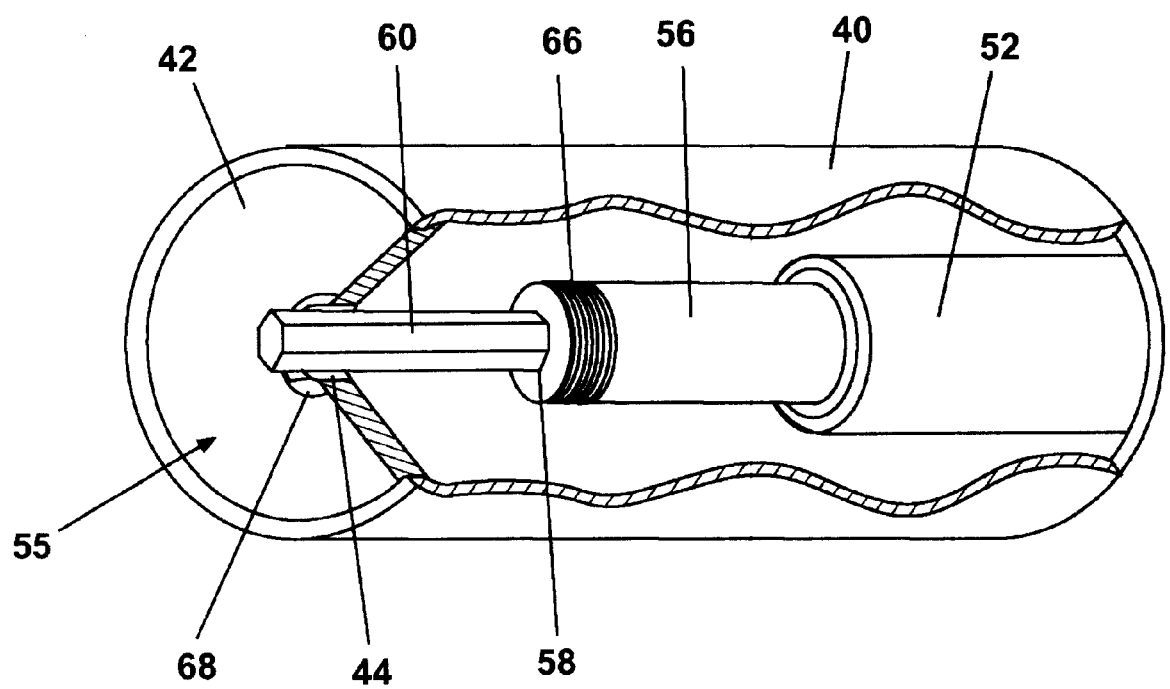
FIG. 6 is a perspective cutaway view of a portion of the hollow rod actuator of FIG. 2 as assembled.

The anti-rotation rod 60 is inserted through the opening 44 and the insert bore 58 into the rod bore 54, and is fixedly attached to the end cap 42, such as by a weld 68 encircling the anti-rotation rod 60 along the intersection of the anti-rotation rod 60 with the opening 44, as shown in FIG. 6, or other suitable connector, such as a locknut. (The piston 50 has been removed in FIG. 6 for clarity.) As so assembled, the anti-rotation rod 60 will be fixed against rotation relative to the cylinder 40 through the welding of the anti-rotation rod 60 to the end cap 42, and the end cap 42 to the cylinder 40. The rod insert 56 can slide along the anti-rotation rod 60 with the movement of the piston 50, but will be restrained against rotation by the flat-sided cross-section of the anti-rotation rod 60 and the insert bore 58. The length of the anti-rotation rod 60 can be adapted to terminate at the end cap 42, extending into the rod bore 54 sufficiently to accommodate the full stroke of the piston 50. Thus, with the piston rod 52 pivotally but not rotationally connected to an anchor point on the transit mixer 16, the cylinder 40 will be prevented from rotating relative to the piston rod 52 through the engagement of the anti-rotation rod 60 with the insert bore 58.

By preventing the hollow rod actuator rod from rotating, the hydraulic actuator assembly 10 becomes non-rotating, and is prevented from swinging after it has been mounted on the transit mixer 16. The hydraulic actuator assembly 10 has a less bulky configuration than prior art actuator assemblies, and a much lighter weight. This improves the driver's view of the road by reducing the size of the hydraulic actuator assembly, and increases fuel economy. Because the anti-rotation rod 60 and the rod insert 56 are enclosed within the cylinder 40, hydraulic oil constantly bathes the entire assembly. This eliminates the need for ongoing greasing or maintenance, and insurers that the device will move freely and smoothly in operation. Because the anti-rotation device is completely contained within the cylinder 40, it is fully protected from any external damage.

The entire assembly is much stronger and more rigid than the prior art devices because the anti-rotation rod 60 and the rod insert 56 are coaxial with the centerline of the cylinder 40. By eliminating the mounting of the prior art external non-rotation device to the actuator, installation of the hydraulic actuator assembly 10 is much easier, and proper alignment is always precisely maintained. The new anti-rotation device eliminates the need to align the end mounting of the prior art external non-rotational device with the mounting of the actuator.

The hydraulic actuator assembly 10 can position the concrete delivery chute 34 through an increased distance. The dual actuators greatly increase the concrete delivery area that can be served without the need to reposition the transit mixer 16. The anti-rotation device described herein effectively prevents the actuators from rotating or twisting to minimize damage to the actuators, lowers the profile and weight of the hydraulic actuator assembly 10, eliminates the need for, and expense of, regular maintenance, and lowers the initial time and cost of purchasing and installing the actuator assembly 10.

Figure 7:
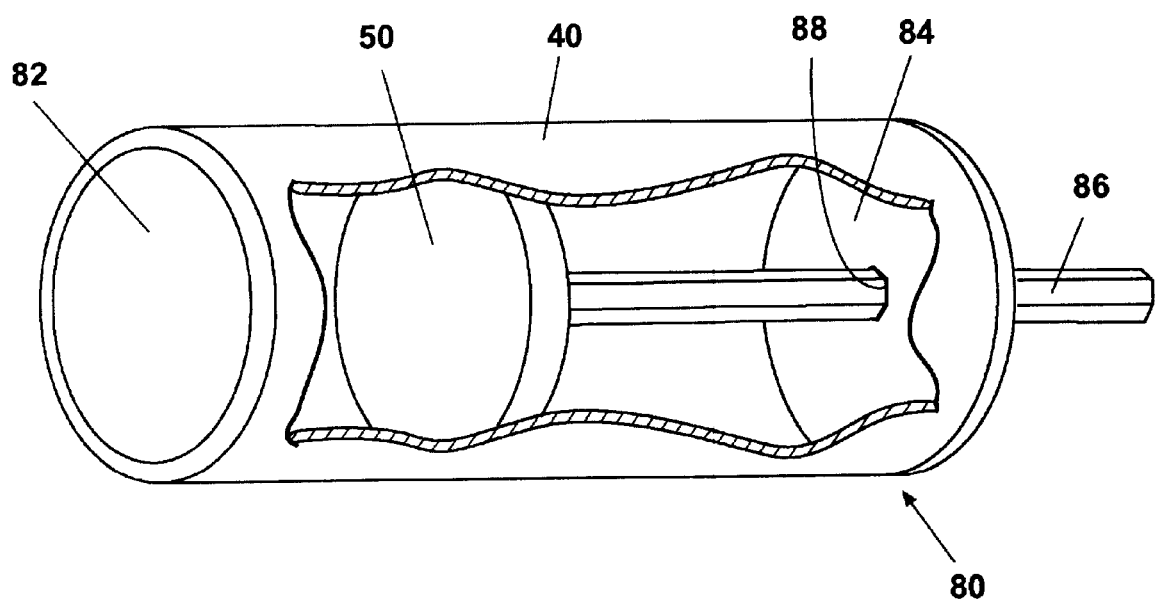
FIG. 7 is a perspective cutaway view of a portion of an alternate embodiment of a hydraulic actuator comprising a portion of the non-rotational, dual hydraulic actuator assembly shown in FIG. 1.

In yet another embodiment, shown in FIG. 7, the hollow piston rod 52 can be replaced with a solid piston rod 86 having a cross-section comprising at least one flat side. A first, distal end of the cylinder 40 is closed with a solid end cap 82. A second, proximal end of the cylinder is closed with an annular cap 84 having a rod aperture 88 complementary to the piston rod cross-section. The cylinders 20, 40 are ganged together as previously described to form the non-rotational dual hydraulic actuator assembly 10.

The invention can also comprise an embodiment wherein the non-rotation mounting 55 is incorporated into both hydraulic actuators 12, 14. In such embodiment, the solid piston rod 30 is replaced with a hollow piston rod, and both piston rods 30, 52 are prevented from rotating relative to their respective cylinders 20, 40.

In yet another embodiment, the anti-rotation rod 60 can be provided with a radially-outwardly extending longitudinal key extending the length of the anti-rotation rod 60, rather than a flat side, which is keyed to a complementary channel formed in the insert bore 58 to prevent rotation of the anti-rotation rod 60 in the insert bore 58. Conversely, the channel can be formed in the anti-rotation rod 60, and the key can be provided in the insert bore 58.

While the invention has been specifically described in connection with certain embodiments thereof, it is to be understood that this is by way of illustration and not of limitation. Reasonable variation and modification are possible within the scope of the forgoing description and drawings without departing from the spirit of the invention, which is described in the appended claims.

The invention claimed is:

1. A hydraulic actuator assembly for moving a first object relative to a second object, comprising;

a first hydraulic actuator having a first cylinder with a first longitudinal axis, and a first piston slidable within the cylinder and attached to a first piston rod for movement along the first longitudinal axis with respect to the cylinder;

a second hydraulic actuator having a second cylinder with a second longitudinal axis, a second piston slidable in the second cylinder and attached to a second piston rod for movement along the second longitudinal axis with respect to the second cylinder, and a non-rotation mounting located in the interior of the second cylinder between the second piston rod and the second cylinder for non-rotational movement of the second piston rod about the second longitudinal axis; and a rigid mounting between the first cylinder and the second cylinder so that the first longitudinal axis is parallel to the second longitudinal axis, and the first piston rod and the second piston rod are movable in opposite directions.

2. The hydraulic actuator assembly according to claim 1 wherein the second piston rod has an axial bore therein.

3. The hydraulic actuator assembly according to claim 2 wherein the non-rotation mounting comprises an anti-rotation rod having a non-circular cross-section and adapted for slidable translation within the axial bore.

4. The hydraulic actuator assembly according to claim 3 wherein at least a portion of the axial bore is adapted with a non-circular cross-section complementary to the cross-section of the anti-rotation rod for slidable non-rotatable receipt of the anti-rotation rod.

5. The hydraulic actuator assembly according to claim 4 wherein the second actuator has an end cap that is non-rotatable about the second longitudinal axis, and the anti-rotation rod is rigidly attached to the end cap for insertion in the axial bore and restrained from rotational movement about the second longitudinal axis.

6. The hydraulic actuator assembly according to claim 3 wherein the non-rotation mounting further comprises a rod insert that is non-rotatably attached to the second piston rod within the second cylinder, the rod insert has a non-circular aperture coaxial with the second longitudinal axis and complementary to the cross-section of the anti-rotation rod, and the anti-rotation rod is slidably received in the non-circular aperture of the rod insert to prevent rotation of the second piston rod relative to the anti-rotation rod.

7. The hydraulic actuator assembly according to claim 3 wherein the anti-rotation rod has a rectilinear cross-section.

8. The hydraulic actuator assembly according to claim 3 wherein the anti-rotation rod has a hexagonal cross-section.

9. The hydraulic actuator assembly according to claim 3 wherein one of the anti-rotation rod and the axial bore comprises a key and the other of the anti-rotation rod and the axial bore comprises a complementary channel adapted for slidable receipt of the key therein.

10. The hydraulic actuator assembly according to claim 1 and further comprising a non-rotation mounting between the first piston rod and the first cylinder for non-rotational movement of the first piston rod about the first longitudinal axis.

11. The hydraulic actuator assembly according to claim 1 wherein the non-rotation mounting comprises a cylinder end cap non-rotatably attached to the second cylinder and having a non-circular aperture therethrough, and the second piston rod has a non-circular cross-section complementary to the non-circular aperture and adapted for slidable receipt in the non-circular aperture.

12. A combination of a concrete mixer truck having a concrete delivery chute for delivering concrete from the concrete mixer truck to a preselected location, and a hydraulic actuator assembly attached to the concrete mixer truck for positioning the concrete delivery chute relative to the concrete mixer truck, comprising:

a first hydraulic actuator having a first cylinder with a first longitudinal axis, and a first piston slidable within the cylinder and attached to a first piston rod for movement along the first longitudinal axis with respect to the cylinder;

a second hydraulic actuator having a second cylinder with a second longitudinal axis, a second piston slidable in the second cylinder and attached to a second piston rod for movement along the second longitudinal axis with respect to the second cylinder, and a non-rotation mounting between the second piston rod and the second cylinder for non-rotational movement of the second piston rod about the second longitudinal axis; and a rigid mounting between the first cylinder and the second cylinder so that the first longitudinal axis is parallel to the second longitudinal axis, and the first piston rod and the second piston rod are movable in opposite directions.

13. The combination according to claim 12 wherein the second piston rod has an axial bore therein.

14. The combination according to claim 13 wherein the non-rotation mounting comprises an anti-rotation rod having a non-circular cross-section and adapted for slidable translation within the axial bore.

15. The combination according to claim 14 wherein at least a portion of the axial bore is adapted with a non-circular cross-section complementary to the cross-section of the anti-rotation rod for slidable non-rotatable receipt of the anti-rotation rod.

16. The combination according to claim 15 wherein the second actuator has an end cap that is non-rotatable about the second longitudinal axis, and the anti-rotation rod is rigidly attached to the end cap for insertion in the axial bore and restrained from rotational movement about the second longitudinal axis.

17. The combination according to claim 14 wherein the non-rotation mounting further comprises a rod insert that is non-rotatably attached to the second piston rod within the second cylinder, the rod insert has a non-circular aperture coaxial with the second longitudinal axis and complementary to the cross-section of the anti-rotation rod, and the anti-rotation rod is slidably received in the non-circular aperture of the rod insert to prevent rotation of the second piston rod relative to the anti-rotation rod.

18. The combination according to claim 14 wherein the anti-rotation rod has a rectilinear cross-section.

19. The combination according to claim 14 wherein the anti-rotation rod has a hexagonal cross-section.

20. The combination according to claim 14 wherein one of the anti-rotation rod and the axial bore comprises a key and the other of the anti-rotation rod and the axial bore comprises a channel adapted for slidable receipt of the key therein.

21. The combination according to claim 12 and further comprising a non-rotation mounting between the first piston rod and the first cylinder for non-rotational movement of the first piston rod about the first longitudinal axis.

22. The combination according to claim 12 wherein the non-rotation mounting comprises a cylinder end cap non-rotatably attached to the second cylinder and having a non-circular aperture therethrough, and the second piston rod has a non-circular cross-section complementary to the non-circular aperture and adapted for slidable receipt in the non-circular aperture.

* * * * *